United States Patent
Gill

(10) Patent No.: US 7,706,108 B2
(45) Date of Patent: Apr. 27, 2010

(54) LEAD/SHIELD STRUCTURE FOR READ HEAD SENSORS

(75) Inventor: Hardayal (Harry) Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 695 days.

(21) Appl. No.: 11/361,758

(22) Filed: Feb. 24, 2006

(65) Prior Publication Data

US 2007/0201166 A1 Aug. 30, 2007

(51) Int. Cl.
*G11B 5/33* (2006.01)

(52) U.S. Cl. .................................................... 360/319

(58) Field of Classification Search .................. 360/319
See application file for complete search history.

(56) References Cited

U.S. PATENT DOCUMENTS

| | | | | |
|---|---|---|---|---|
| 6,477,013 B1 * | 11/2002 | Kang et al. | ............... | 360/236.3 |
| 6,687,074 B2 * | 2/2004 | Takahashi | ............... | 360/67 |
| 6,713,800 B2 * | 3/2004 | Chen et al. | ............... | 257/295 |
| 6,751,072 B2 * | 6/2004 | Freitag et al. | ............... | 360/324.11 |
| 6,856,493 B2 * | 2/2005 | Pinarbasi | ............... | 360/324.11 |
| 6,865,062 B2 * | 3/2005 | Pinarbasi | ............... | 360/324.11 |
| 6,943,993 B2 * | 9/2005 | Chang et al. | ............... | 360/319 |
| 7,082,017 B2 * | 7/2006 | Freitag et al. | ............... | 360/324.11 |
| 7,161,773 B2 * | 1/2007 | Fontana et al. | ............... | 360/324.1 |
| 7,194,797 B2 * | 3/2007 | Pinarbasi | ............... | 29/603.14 |
| 2002/0051869 A1 * | 5/2002 | Takahashi | ............... | 428/195 |
| 2002/0064002 A1 * | 5/2002 | Gill | ............... | 360/319 |
| 2002/0131209 A1 * | 9/2002 | Anaya-Dufresne et al. | ............... | 360/236.2 |
| 2003/0179513 A1 * | 9/2003 | Pinarbasi | ............... | 360/324.11 |
| 2003/0179515 A1 * | 9/2003 | Pinarbasi | ............... | 360/324.11 |
| 2003/0179516 A1 * | 9/2003 | Freitag et al. | ............... | 360/324.11 |
| 2004/0000682 A1 * | 1/2004 | Chen et al. | ............... | 257/295 |
| 2004/0156148 A1 * | 8/2004 | Chang et al. | ............... | 360/319 |
| 2004/0264069 A1 * | 12/2004 | Freitag et al. | ............... | 360/324.11 |
| 2005/0146812 A1 * | 7/2005 | Fontana et al. | ............... | 360/324.2 |
| 2006/0256482 A1 * | 11/2006 | Araki et al. | ............... | 360/319 |
| 2007/0217080 A1 * | 9/2007 | Jayasekara et al. | ............... | 360/319 |
| 2008/0088985 A1 * | 4/2008 | Driskill-Smith et al. | ............... | 360/324.2 |

* cited by examiner

*Primary Examiner*—Allen T Cao

(57) ABSTRACT

One embodiment of the present invention is directed to a read head for a data storage device including a sensor for reading data from a data storage medium, a first shield disposed adjacent to the sensor and characterized as moment-compensated, and a second shield disposed adjacent to the sensor, the second shield being moment-compensated.

27 Claims, 5 Drawing Sheets

US 7,706,108 B2

LEAD/SHIELD STRUCTURE FOR READ HEAD SENSORS

BACKGROUND OF THE INVENTION

Hard disk storage devices are used in many computer system operations. In fact, most computing systems are not operational without some type of hard disk drive or similar storage device to store the most basic computing information such as the boot operation, the operating system, applications, and the like.

The basic hard disk drive model includes a storage disk or hard disk that spins at a designed rotational speed. An actuator arm is utilized to reach out over the surface of the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. For example, the original hard disk drive had a disk diameter of 24 inches. Modern hard disk drives are much smaller and include disk diameters of less than 2.5 inches (micro drives are significantly smaller than that).

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

Some of the recent improvement has resulted from reduction in the size of the read head. FIG. 1 shows a cross section of a common read head 100. Read head 100 typically comprises a sensor 110, shields 121 and 122, and conductive leads 131-132. For the purposes of illustration, thickness will refer to horizontal dimensions in FIG. 1, height will refer to vertical dimensions in the figure, and width will refer to dimensions going into the page. In today's read heads, sensors are commonly on the order of 300 Å thick, whereas shields are typically 1-2 microns thick and 50-100 microns wide. Thus, shields 121 and 122 are significantly larger than sensor 110. Furthermore, the separation between the head 100 and disk 140 is typically only around 1-2 nm.

During head operation, the head is excited with high current, causing the temperature in the head to rise. This rise in temperature can cause shields 121 and 122 to thermally expand. Thus, shields 121 and 122, which are commonly made of NiFe, will actually protrude, causing sensor 110 to become recessed. In come cases, shields have been known to protrude as much as 1 nm. This is quite significant considering the small distance between the air bearing surface 150 and the disk 140. Protrusion of the shields hinders the reliability of the sensor interface as well as the sensitivity of the sensor.

Thus, it is desirable to restrict shield thickness to less than 100 nm. However, reducing the size of shields can adversely affect their ability perform their two primary functions: providing resolution by shielding the sensor from fields of bits other than the bit directly below; and providing contacts for external an current supply. First, when the shield material becomes thin, it can easily saturate and will no longer act as a shield. Second, the shield material does not have a high degree of conductivity, so making a shield thinner will only increase its resistivity. Furthermore, decreasing the size of a shield can cause it to become magnetically unstable.

BRIEF SUMMARY OF INVENTION

Accordingly, one embodiment of the present invention is directed to a read head for a data storage device including a sensor for reading data from a data storage medium, a first shield disposed adjacent to the sensor and characterized as moment-compensated, and a second shield disposed adjacent to the sensor, the second shield being moment-compensated.

Another embodiment of the present invention is directed to a data storage device including a disk with a data surface, a rotator for rotating the disk, and a read/write head for reading and writing data with respect to the data surface. The read/write head includes a sensor for reading data from a data storage medium, a first shield disposed adjacent to the sensor and characterized as moment-compensated, and a second shield disposed adjacent to the sensor and characterized as moment-compensated.

Another embodiment of the present invention is directed to a read head for a data storage device including a sensor for reading data from a data storage medium, a first shield disposed adjacent to the sensor, a second shield disposed adjacent to the sensor, a first antiferromagnet disposed adjacent to the first shield, and a second antiferromagnet disposed adjacent to the second shield.

DETAILED DESCRIPTION OF THE INVENTION

A head assembly and a data recording device configured to use a head assembly are disclosed. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
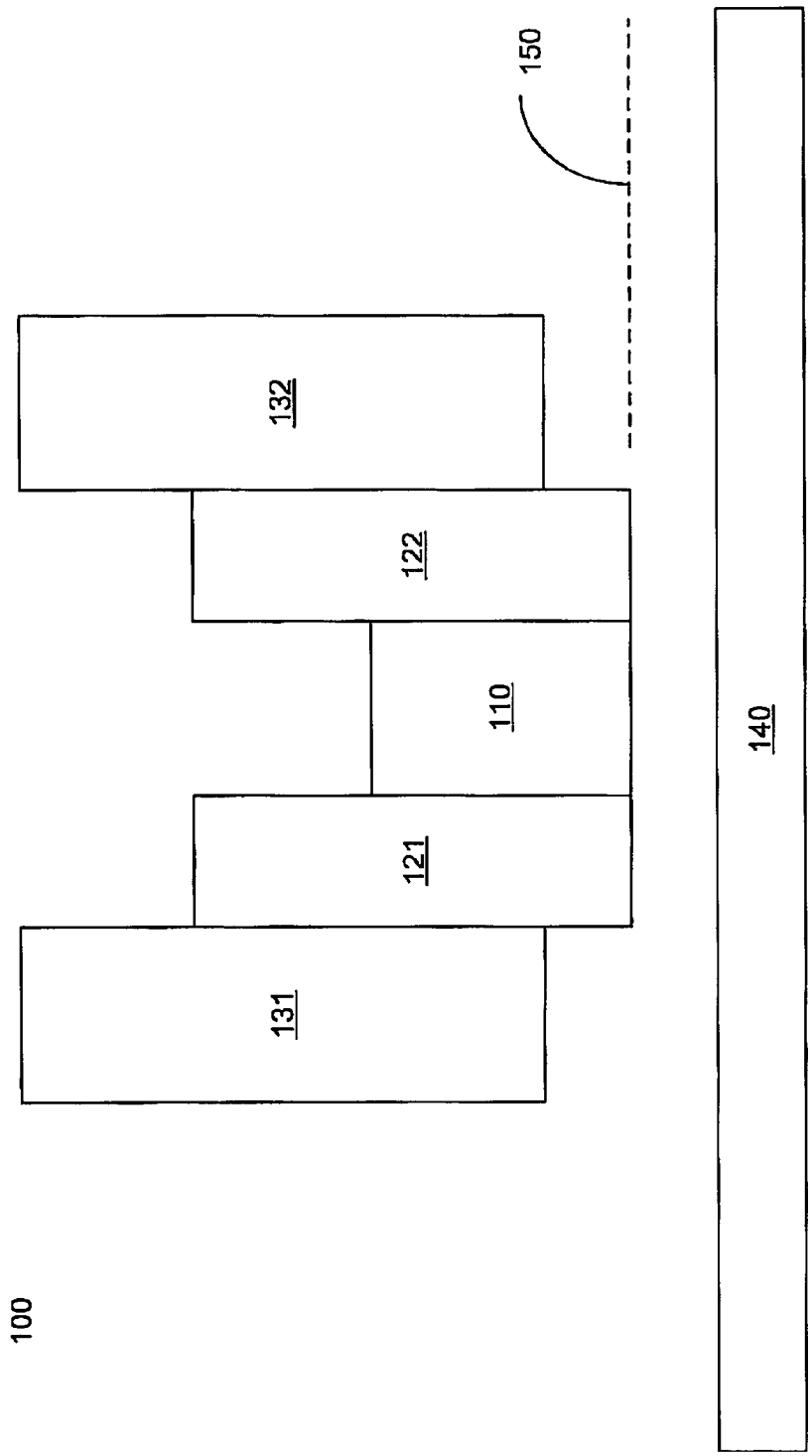
FIG. 1 a side view of a prior art read head design.
Figure 2:
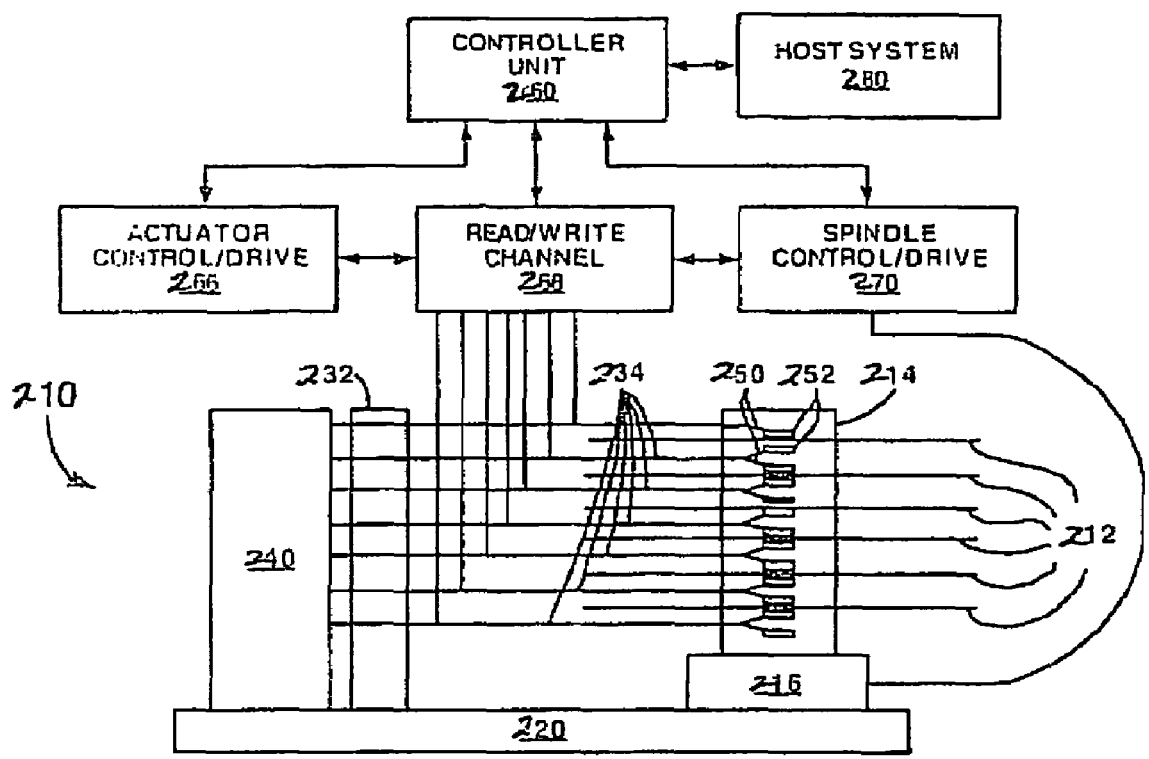
FIG. 2 is a side view of a hard disk drive and a controller unit in block form, in accordance with one embodiment of the present invention.
Figure 3:
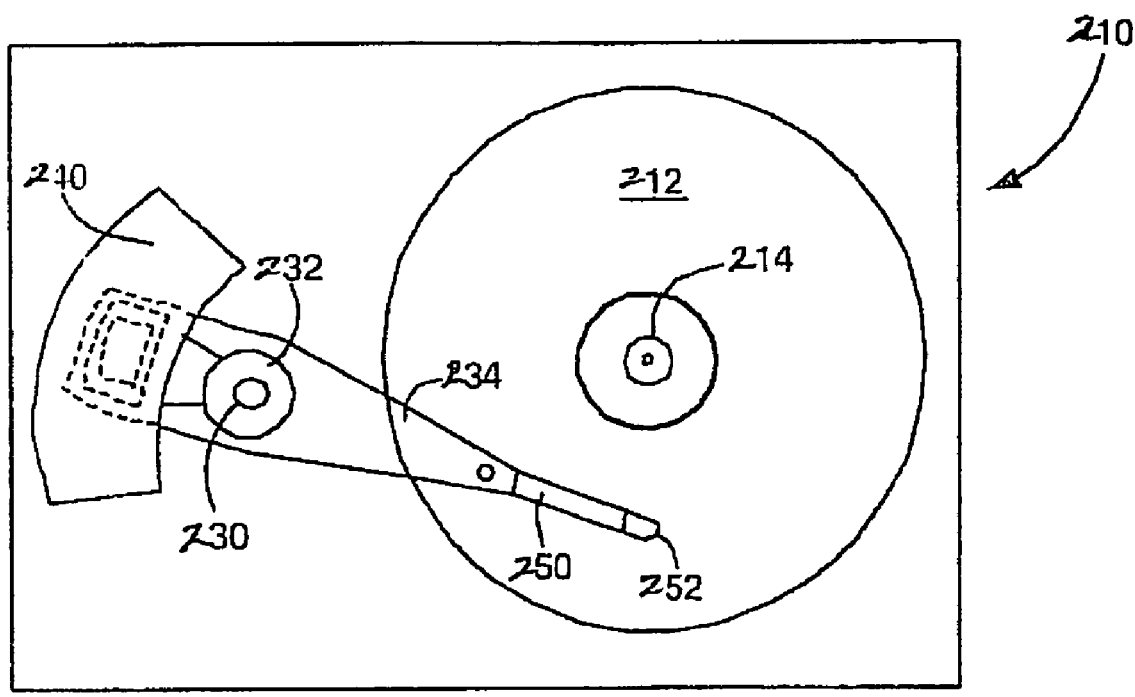
FIG. 3 is a top view of a hard disk drive system, in accordance with one embodiment of the present invention.

With reference now to FIGS. 2 and 3, a side and top view of a hard disk drive 210 is shown. Drive 210 has a disk pack having at least one media or magnetic disk 212, mounted to a spindle 214. A spindle motor 216 rotates the spindle 214 and the disk or disks 212. The spindle motor 214 and an actuator shaft 230 are attached to the chassis 220. A hub assembly 232 rotates about the actuator shaft 230 and supports a plurality of actuator arms 234, referred to as a "comb." A rotary voice coil motor 140 is attached to the chassis 220 and to a rear portion of the actuator arms 234.

A plurality of suspension assemblies 250 are attached to the actuator arms 234. A plurality of transducer heads or sliders 252 are attached respectively to the suspension assemblies 250. The sliders 252 are located proximate to the disks 212 for reading and writing. The rotary voice coil motor 240 rotates actuator arms 234 about the actuator shaft 230 in order to move the suspension assemblies 250 to the desired radial position on disks 212. The shaft 230, hub 232, arms 234, and motor 240 may be referred to collectively as a rotary actuator assembly.

A controller unit 260 provides overall control to system 210. Controller unit 260 typically includes (not shown) a central processing unit (CPU), a memory unit and other digital circuitry, although it should be apparent that one skilled in the computer arts could also enable these aspects as hardware logic. Controller 260 is connected to an actuator control/drive unit 266 that in turn is connected to the rotary voice coil motor 240. This configuration allows controller 260 to control rotation of the disks 212. A host system 280, typically a computer system, is connected to the controller system 260. The host system 280 may send digital data to the controller 260 to be stored on disks 212, or it may request that digital data at a specified location be read from the disks 212 and sent to the system 280. The basic operation of DASD units is well known in the art and is described in more detail in The Magnetic Recording Handbook, C. Dennis Mee and Eric D. Daniel, McGraw-Hill Book Company, 1990, hereby incorporated by reference as background.

Figure 4:
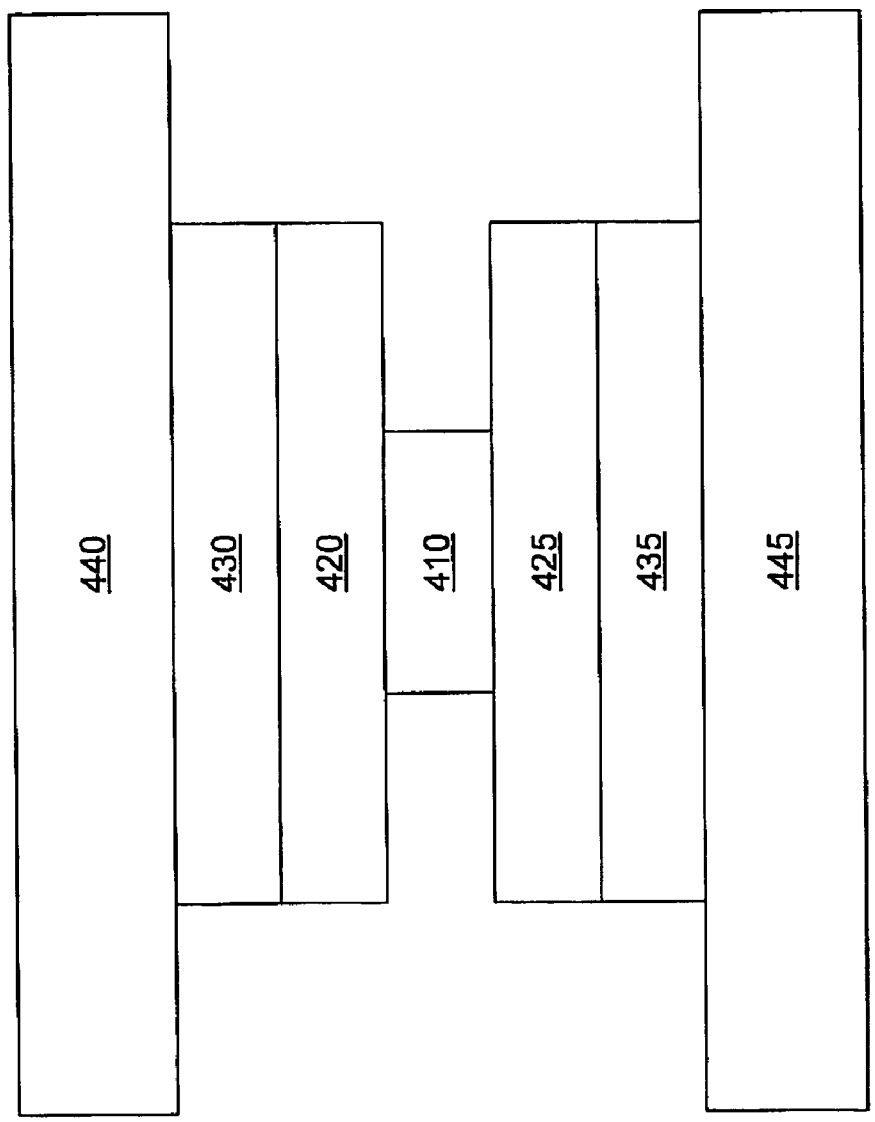
FIG. 4 is an air bearing surface view of a read head for a data storage device, in accordance with an embodiment of the present invention.

With reference now specifically to the read head, as stated above, decreasing the thickness of sensor shields lowers the conductivity of the shields and also makes them more susceptible to saturation. One solution to the saturation problem is to put an antiferromagnet material in contact with the read-head's shield. FIG. 4 shows an example of a read head 400, as viewed from the air bearing surface, that utilizes an antiferromagnet, in accordance with an embodiment of the present invention. In one embodiment, read head 400 includes a sensor 410. In one embodiment, sensor 410 is a current perpendicular to the plane of the layers type sensor. Read head 400 also includes two shields 420 and 425 disposed adjacent to sensor 410. The shield material can be NiFe, CoFe, iron nitride, or any other appropriate shield material.

Read head 400 also includes antiferromagnets 430 and 435 disposed adjacent to shields 420 and 425 and conductive leads 440 and 445 disposed adjacent to antiferromagnets 430 and 435. Antiferromagnets 430 and 435 comprise an antiferromagnet material such as iron-magnesium or platinum-magnesium alloys. It should be appreciated that other antiferromagnet materials could be used as well. Placing antiferromagnets 430 and 435 in contact with shields 420 and 425 develops exchange coupling between the materials, causing the saturation field of shields 420 and 425 to increase. Raising the saturation fields of shields 420 and 425 allows for the shields to be much thinner while still maintaining their functionality. In one embodiment, shields 420 and 425 are equal to or less than 50 nm thick, and the combined thickness of shields 420 and 425 and their respective antiferromagnets 430 and 435 is equal to or less than 100 nm. In FIG. 4, the thickness dimension should be understood as the vertical dimension of the page.

Figure 5:
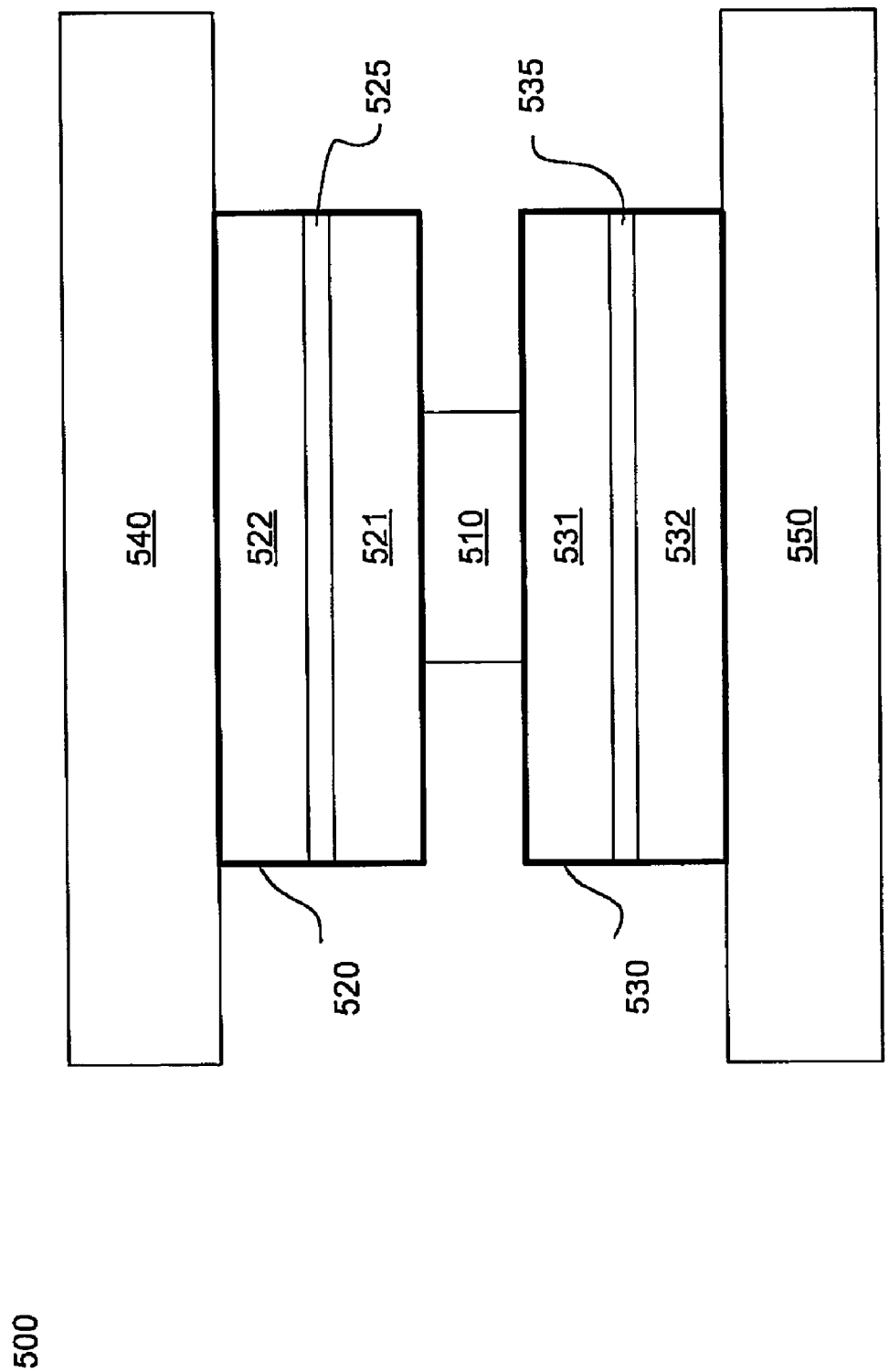
FIG. 5 is an air bearing surface view of a read head for a data storage device, in accordance with an embodiment of the present invention.

In another embodiment, the saturation problem is solved by anti-parallelly coupling the shield material with anti-parallel coupling material. FIG. 5 shows an example of a read head 500 as viewed from the air bearing surface that utilizes anti-parallel coupling, in accordance with an embodiment of the present invention. Read head 500 includes sensor 510. In one embodiment, sensor 510 is a current perpendicular to the plane of the layers type sensor. Read head 500 also includes two shields 520 and 530 disposed adjacent to sensor 510 and two conductive leads 540 and 550 disposed adjacent to shields 520 and 530. Shields 520 and 530 each include a first layer of shield material 521 and 531 having a magnetic moment and a second layer of shield material 522 and 532 having a magnetic moment that is anti-parallel to its respective first layer 521 and 531. The shield material can be NiFe, CoFe, iron nitride, or any other appropriate shield material. Shields 520 and 530 also include a layer of anti-parallel coupling material 525 and 535 disposed between their respective first layers 521 and 531 and second layers 522 and 532. In one embodiment, coupling material 525 and 535 comprises ruthenium. The conductivity problem can be solved by adding another high-conductivity, non-magnetic material in contact with the shield to lower its resistivity. However, this does not resolve any saturations issues with the shields. The shield material can be NiFe, CoFe, iron nitride, or any other appropriate shield material. Disposed between the first layers 521 and 531 and the second layers 522 and 532. Anti-parallelly coupling first layers 521 and 531 and second layers 522 and 532 significantly increases the saturation fields of shields 520 and 530. Raising the saturation fields of shields 520 and 530 allows for the shields to be much thinner while still maintaining their functionality. In one embodiment, shields 520 and 530 are equal to or less than 100 nm thick. In a preferred embodiment, layers 521-522 and 531-532 are equal to or less than 200 angstrom thick. In one embodiment, shields 520 and 530 are also equal to or less than 100 microns in height and equal to or less than 100 microns in width. In FIG. 5 it should be understood that the thickness dimension is the vertical dimension of the page, the width dimension is the horizontal dimension of the page, and the height dimension is the dimension into the page.

Furthermore, using anti-parallel coupling in the manner illustrated in FIG. 5 also serves to solve the resistivity problem as well. Ruthenium and other similar materials are highly conductive. Thus, putting such materials in contact with shield materials 521-522 and 531-532 as a coupling material significantly lowers the overall resistivity of shields 520 and 530.

Thus, embodiments of the present invention provide a means and structure for reduced thickness of read head shields while at the same time avoiding the saturation and resistivity problems associated with thinner shields. As a consequence of the reduced thickness, the shields will protrude much less due to thermal expansion. Therefore, the tolerances between the read head and the disk surface may be reduced, contributing to a reduction in the overall size of a storage device in multiple dimensions.

Embodiments of the present invention are thus described. While the present invention has been described in particular embodiments, it should be appreciated that the present invention should not be construed as limited by such embodiments, but rather construed according to the below claims.

What is claimed is:

1. A read head for a data storage device comprising:
a sensor for reading data from a data storage medium;
a first shield disposed in physical contact with said sensor and characterized as moment-compensated; and
a second shield disposed in physical contact with said sensor, said second shield being moment-compensated, wherein said first shield and said second shield comprises a plurality of layers.

2. The read head described in claim 1 wherein said sensor is a current perpendicular to the plane of the layers (CPP) type sensor.

3. The read head described in claim 1 wherein said first shield has a thickness dimension equal to or less than 100 nm.

4. The read head described in claim 3 wherein said second shield has a thickness dimension equal to or less than 100 nm.

5. The read head described in claim 1 wherein said first shield and said second shield each have a height dimension equal to or less than 100 microns.

6. The read head described in claim 1 wherein said first shield and said second shield each have a width dimension equal to or less than 100 microns.

7. The read head described in claim 1 wherein said first shield comprises:
a first layer having a magnetic moment; and
a second layer disposed adjacent to said first layer and having a magnetic moment that is anti-parallel to said magnetic moment of said first layer.

8. The read head described in claim 7 wherein said first layer and said second layer are selected from NiFe, CoFe, and Iron Nitride.

9. The read head described in claim 7 wherein said second shield comprises:
a first shield layer having a magnetic moment; and
a second shield layer having a magnetic moment and coupled to said first shield layer such that said magnetic moment of said second shield layer is anti-parallel to said magnetic moment of said first shield layer.

10. A data storage device comprising:
a disk with a data surface;
a rotator for rotating said disk; and
a read/write head for reading and writing data with respect to said data surface, said read/write head comprising:
a sensor for reading data from a data storage medium;
a first shield disposed in physical contact with said sensor and characterized as moment-compensated; and
a second shield disposed in physical contact with said sensor and characterized as moment-compensated, wherein said first shield and said second shield comprises a plurality of layers.

11. The data storage device described in claim 10 wherein said sensor is a current perpendicular to the plane of the layers (CPP) type sensor.

12. The data storage device described in claim 10 wherein said first shield has a thickness dimension equal to or less than 100 nm.

13. The data storage device described in claim 12 wherein said second shield has a thickness dimension equal to or less than 100 nm.

14. The data storage device described in claim 10 wherein said first shield and said second shield each have a height dimension equal to or less than 100 microns.

15. The data storage device described in claim 10 wherein said first shield and said second shield each have a width dimension equal to or less than 100 microns.

16. The data storage device described in claim 10 wherein said first shield comprises:
a first layer having a magnetic moment; and
a second layer disposed adjacent to said first layer and having a magnetic moment that is anti-parallel to said magnetic moment of said first layer.

17. The data storage device described in claim 16 wherein said first layer and said second layer are selected from NiFe, CoFe, and Iron Nitride.

18. The data storage device described in claim 16 wherein said first shield further comprises a coupling material disposed between said first layer and said second layer.

19. The data storage device described in claim 18 wherein said coupling material comprises Ruthenium.

20. The data storage device described in claim 16 wherein said second shield comprises:
a first shield layer having a magnetic moment; and
a second shield layer having a magnetic moment and coupled to said first shield layer such that said magnetic moment of said second shield layer is anti-parallel to said magnetic moment of said first shield layer.

21. A read head for a data storage device comprising:
a sensor for reading data from a data storage medium;
a first shield disposed in physical contact with said sensor;
a second shield disposed in physical contact with said sensor;
a first antiferromagnet disposed in physical contact with said first shield; and
a second antiferromagnet disposed in physical contact with said second shield, wherein said first shield and said second shield comprises a plurality of layers.

22. The read head described in claim 21 wherein said sensor is a current perpendicular to the plane of the layers (CPP) type sensor.

23. The read head described in claim 21 wherein said first shield has a thickness dimension equal to or Less than 50 nm.

24. The read head described in claim 23 wherein said second shield has a thickness dimension equal to or less than 50 nm.

25. The read head described in claim 21 wherein said first shield and said first antiferromagnet have a combined thickness dimension equal to or less than 100 nm.

26. The read head described in claim 25 wherein said second shield and said second antiferromagnet have a combined thickness dimension equal to or less than 100 nm.

27. The read head described in claim 21 wherein said first shield and said second shield are selected from NiFe, CoFe, and Iron Nitride.

* * * * *